US009364858B2

(12) United States Patent
Matura et al.

(10) Patent No.: US 9,364,858 B2
(45) Date of Patent: Jun. 14, 2016

(54) METHOD FOR PRODUCING A COLOURING AND/OR EFFECT-GIVING MULTILAYER PAINT FINISH

(75) Inventors: Michael Matura, Kitzingen (DE); Bernhard Steinmetz, Rütschenhausen (DE); Matthias Schad, Würzburg (DE)

(73) Assignee: BASF Coatings GmbH, Munster (DE)

( * ) Notice: Subject to any disclaimer, the term of this patent is extended or adjusted under 35 U.S.C. 154(b) by 229 days.

(21) Appl. No.: 14/128,943

(22) PCT Filed: Jul. 6, 2012

(86) PCT No.: PCT/EP2012/063289
§ 371 (c)(1),
(2), (4) Date: Feb. 5, 2014

(87) PCT Pub. No.: WO2013/004820
PCT Pub. Date: Jan. 10, 2013

(65) Prior Publication Data
US 2015/0044380 A1 Feb. 12, 2015

Related U.S. Application Data

(60) Provisional application No. 61/504,718, filed on Jul. 6, 2011.

(30) Foreign Application Priority Data

Jul. 6, 2011 (EP) .................................... 11172816

(51) Int. Cl.
*B05D 1/02* (2006.01)
*B05D 5/06* (2006.01)
*C08K 5/10* (2006.01)
*C09D 5/02* (2006.01)
*C09D 7/00* (2006.01)
*C09D 7/12* (2006.01)
*B05D 3/02* (2006.01)
*B05D 3/06* (2006.01)
*C09D 175/04* (2006.01)
*B05D 7/00* (2006.01)

(52) U.S. Cl.
CPC *B05D 5/061* (2013.01); *B05D 1/02* (2013.01); *B05D 3/0254* (2013.01); *B05D 3/06* (2013.01); *B05D 7/532* (2013.01); *B05D 7/534* (2013.01); *C08K 5/10* (2013.01); *C09D 5/024* (2013.01); *C09D 7/001* (2013.01); *C09D 7/1233* (2013.01); *C09D 175/04* (2013.01); *B05D 7/536* (2013.01)

(58) Field of Classification Search
None
See application file for complete search history.

(56) References Cited

U.S. PATENT DOCUMENTS

| 5,100,735 | A  | * | 3/1992 | Chang ............... B05D 7/534 427/407.1 |
| 2002/0031609 | A1 | * | 3/2002 | Dattilo ............. B05B 15/1207 427/377 |
| 2002/0071918 | A1 | * | 6/2002 | Emch ................ B05D 3/0209 427/557 |
| 2002/0104460 | A1 | * | 8/2002 | Van Engelen ...... C08G 18/2825 106/194.1 |
| 2002/0122892 | A1 | * | 9/2002 | Dattilo .............. B05B 12/1418 427/240 |
| 2004/0091716 | A1 | * | 5/2004 | Van Den Berg ...... B05D 7/16 428/422.8 |
| 2004/0180993 | A1 |   | 9/2004 | Shelton et al. |
| 2007/0100026 | A1 | * | 5/2007 | Munro ............... C08F 257/02 523/200 |
| 2009/0104357 | A1 | * | 4/2009 | Dattilo ............... B05D 7/57 427/331 |

FOREIGN PATENT DOCUMENTS

| CA | 2751955 A1 | 8/2010 |
| CN | 1462780 A | 12/2003 |
| DE | 4009858 A1 | 10/1991 |
| DE | 19914896 A1 | 10/2000 |
| DE | 19930665 A1 | 1/2001 |
| DE | 19948004 A1 | 7/2001 |
| DE | 10043405 C1 | 6/2002 |
| EP | 0228003 A1 | 7/1987 |
| EP | 0521928 B1 | 8/1994 |
| EP | 0634431 A1 | 1/1995 |
| WO | WO9215405 A1 | 9/1992 |
| WO | WO2006136920 A2 | 12/2006 |

OTHER PUBLICATIONS caplus and wpix abstracts of CN 1462780, Dec. 2003.*

(Continued)

*Primary Examiner* — Erma Cameron
(74) *Attorney, Agent, or Firm* — Servilla Whitney LLC

(57) ABSTRACT

Disclosed is a method for producing a multicoat color and/or effect paint system, comprising (1) applying a pigmented aqueous basecoat to a substrate, (2) forming a polymer film from the basecoat applied in stage (1), (3) applying a clearcoat to the polymer film, and then (4) curing the polymer film together with the applied clearcoat to form a clearcoat film. The pigmented aqueous basecoat comprises at least one ester characterized by the following structure:

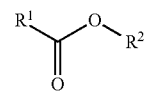

where $R^1$ is selected from the group of ethyl and isopropyl and $R^2$ is a $C_2$ to $C_8$ radical. The at least one ester is used here in an amount of 0.1% to 5% by weight, based on the total weight of the aqueous basecoat applied in stage (1). The invention further provides the corresponding coating materials and the use of the esters in pigmented aqueous coating materials.

9 Claims, No Drawings

(56) References Cited

OTHER PUBLICATIONS

Registry file of RN 97-85-8, Nov. 1984.*
English Translation of International Preliminary Report on Patentability for International Application No. PCT/EP2012/063289 issued Jan. 7, 2014, 7 pages.
International Search Report for International Application No. PCT/EP2012/063289 mailed Sep. 26, 2012, 4 pages.
English Translation of International Search Report for International Application No. PCT/EP2012/063289 mailed Sep. 26, 2012, 3 pages.
Written Opinion for International Application No. PCT/EP2012/063289 mailed Sep. 26, 2012, 6 pages.

* cited by examiner

METHOD FOR PRODUCING A COLOURING AND/OR EFFECT-GIVING MULTILAYER PAINT FINISH

CROSS REFERENCE TO RELATED APPLICATIONS

This application is a National Phase Application of Patent Application PCT/EP2012/063289 filed on 6 Jul. 2012, which claims priority to U.S. 61/504,718 6 Jul., 2011 and EP 11172816.8 filed 6 Jul. 2011, of which all the aforementioned applications are incorporated by reference herein in their entirety.

FIELD OF THE INVENTION

The invention relates to a method for producing a multicoat color and/or effect paint system, by
(1) applying a pigmented aqueous basecoat to a substrate,
(2) forming a polymer film from the coating applied in stage (1),
(3) applying a clearcoat to the resultant basecoat film, and then
(4) curing the basecoat film together with the clearcoat film,

BACKGROUND OF THE INVENTION

The invention also relates to pigmented aqueous basecoat materials suitable for producing multicoat color and/or effect paint systems.

The method described above is known (cf., for example, German patent application DE 199 48 004 A1, page 17 line 37 to page 19 line 22, or German patent DE 100 43 405 C1, column 3 paragraph [0018], and column 8 paragraph [0052], to column 9 paragraph [0057], in conjunction with column 6 paragraph [0039], to column 8 paragraph [0050]), and is in extensive use, for example, for both the OEM finishing (original finishing) and the refinishing of automobile bodies.

The method in question, referred to as the basecoat/clearcoat method, proceeds via a wet-on-wet process to give multicoat color and/or effect paint systems. With these paint systems, visible pinholes often occur, as very small holes in clearcoat and basecoat film.

The objective on which the present invention is based is therefore that of providing a method, of the type described above, with which multicoat color and/or effect paint systems are obtainable that are improved over the paint systems of the prior art. The paint systems ought in particular to have no or only very few pinholes, and/or an increased pinholing limit. The pinholing limit is that dry basecoat film thickness above which pinholes occur.

SUMMARY OF THE INVENTION

This object is achieved, surprisingly, by using in stage (1) of the basecoat/clearcoat method described above a pigmented aqueous basecoat which comprises at least one ester which is characterized by the following structure:

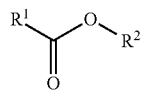

where $R^1$ is selected from the group of ethyl and isopropyl and $R^2$ is a $C_2$ to $C_8$ radical. The at least one ester is used here in an amount of 0.1% to 5% by weight, based on the total weight of the aqueous basecoat applied in stage (1).

The invention also provides the above-described, pigmented aqueous coatings that can be used in stage (1) of the basecoat/clearcoat method.

DETAILED DESCRIPTION OF AN EMBODIMENT OF THE INVENTION

In stage (1) of the method of the invention it is possible in principle to use all known aqueous basecoats provided they contain at least one of the above-defined esters in an amount of 0.1% to 5% by weight, based on the total weight of the aqueous basecoat. Basecoats are termed aqueous when they contain 30% to 70% by weight of water, based on the total weight of the basecoat. The terms "aqueous basecoat" and "waterborne basecoat" are used in this specification as synonymous terms.

The basecoats used in accordance with the invention comprise color and/or effect pigments. Such color pigments and effect pigments are known to the person skilled in the art and are described, for example, in Römpp-Lexikon Lacke and Druckfarben, Georg Thieme Verlag, Stuttgart, New York, 1998, pages 176 and 451. The pigment content may for example be in the range from 1% to 40%, preferably 2% to 20%, more preferably 5% to 15%, by weight, based on the total weight of the pigmented aqueous basecoat.

In the method of the invention it is preferred to use basecoats which as binders comprise binders curable physically, thermally, or both thermally and with actinic radiation. With particular preference there is at least one saturated or unsaturated polyurethane resin binder present. Coatings of this kind comprising polyurethane resin may likewise typically be cured physically, thermally, or both thermally and with actinic radiation.

In the context of the present invention the term "physical curing" denotes the formation of a film through loss of solvent from polymer solutions or polymer dispersions. Normally no crosslinking agents are needed for this process.

In the context of the present invention the term "thermal curing" denotes the heat-initiated crosslinking of a coating film, for which in the coat which forms the basis either a separately present crosslinking agent or else self-crosslinking binders is or are employed. The crosslinking agent comprises reactive functional groups which are complementary to the reactive functional groups present in the binders. This is typically referred to by those in the art as external crosslinking. Where the complementary reactive functional groups or autoreactive functional groups, i.e., groups which react with groups of the same type, are already present in the binder molecules, the binders are self-crosslinking. Examples of suitable complementary reactive functional groups and autoreactive functional groups are known from German patent application DE 199 30 665 A1, page 7 line 28 to page 9 line 24.

In the context of the present invention, actinic radiation means electromagnetic radiation such as near infrared (NIR), UV radiation, more particularly UV radiation, and particulate radiation such as electron beams. Curing by UV radiation is typically initiated by free-radical or cationic photoinitiators.

Where thermal curing and actinic-light curing are employed jointly, the term "dual cure" is also used.

In the present invention, preference is given to basecoats which are curable thermally or both thermally and with actinic radiation—by means of dual cure.

Particularly preferred are those basecoats which as binder comprise a polyurethane resin and as crosslinking agent comprise an amino resin or a blocked or nonblocked polyisocyanate, preferably an amino resin. Among the amino resins, melamine resins are preferred in particular.

The polyurethane resin preferably present may be hydrophilically stabilized ionically and/or nonionically. In preferred embodiments of the present invention, the polyurethane resin is hydrophilically stabilized ionically. The preferred polyurethane resins are linear or comprise branches. A particularly preferred polyurethane resin is one which is connected with olefinically unsaturated monomers. Preferably, as olefinically unsaturated monomers, monomers containing acrylate and/or methacrylate groups are attached to the polyurethane resin (A), to form polyurethane (meth) acrylates. With very particular preference the polyurethane resin is a polyurethane (meth)acrylate. The polyurethane resin preferably present is curable physically, thermally, or both thermally and with actinic radiation. More particularly it is curable thermally or both thermally and with actinic radiation. With particular preference the polyurethane resin comprises reactive functional groups through which external crosslinking is possible.

Suitable saturated or unsaturated polyurethane resins are described, for example, in German patent application DE 199 14 896 A1, column 1 lines 29 to 49 and column 4 line 23 to column 11 line 5, German patent application DE 199 48 004 A1, page 4 line 19 to page 13 line 48, European patent application EP 0 228 003 A1, page 3 line 24 to page 5 line 40, European patent application EP 0 634 431 A1, page 3 line 38 to page 8 line 9, or international patent application WO 92/15405, page 2 line 35 to page 10 line 32.

For preparing the polyurethane resin it is preferred to use the aliphatic, cycloaliphatic, aliphatic-cycloaliphatic, aromatic, aliphatic-aromatic and/or cycloaliphatic-aromatic polyisocyanates which are known to the skilled worker.

As alcohol component for preparing the polyurethane resins it is preferred to use the saturated and unsaturated polyols of relatively higher molecular mass and of relatively low molecular mass, and also, optionally, monoalcohols as well, in minor amounts, that are known to the skilled worker. Low molecular mass polyols used are, in particular, diols and, in minor amounts, triols, in order to introduce branches. Examples of suitable polyols of relatively high molecular mass are saturated or olefinically unsaturated polyester polyols and/or polyether polyols. As polyols of relatively high molecular mass use is made more particularly of polyester polyols, especially those having a number-average molecular weight of 400 to 5000 g/mol (measured by means of gel permeation chromatography against a polystyrene standard).

For the hydrophilic stabilization and/or for increasing the dispersibility in aqueous medium, the polyurethane resin preferably present may comprise certain ionic groups and/or groups which can be converted into ionic groups (potentially ionic groups). Polyurethane resins of this kind are referred to in the context of the present invention as ionically hydrophilically stabilized polyurethane resins. Likewise present may be nonionic hydrophilically modifying groups. Preference, however, is given to the ionically hydrophilically stabilized polyurethanes. More specifically, the modifying groups are alternatively functional groups which can be converted into cations by neutralizing agents and/or quaternizing agents, and/or cationic groups (cationic modification)

or functional groups which can be converted into anions by neutralizing agents, and/or anionic groups (anionic modification)

and/or nonionic hydrophilic groups (nonionic modification).

As the skilled person is aware, the functional groups for cationic modification are, for example, primary, secondary and/or tertiary amino groups, secondary sulfide groups and/or tertiary phosphine groups, more particularly tertiary amino groups and secondary sulfide groups (functional groups which can be converted by neutralizing agents and/or quaternizing agents into cationic groups). Mention may additionally be made of the cationic groups prepared from the aforementioned functional groups using neutralizing agents and/or quaternizing agents known to the skilled person, such as primary, secondary, tertiary and/or quaternary ammonium groups, tertiary sulfonium groups and/or quaternary phosphonium groups, more particularly quaternary ammonium groups and tertiary sulfonium groups.

The functional groups for anionic modification are known to include, for example, carboxylic, sulfonic and/or phosphonic acid groups, more particularly carboxylic acid groups (functional groups which can be converted by neutralizing agents into anionic groups), and also anionic groups that are prepared from the aforementioned functional groups using neutralizing agents known to the skilled person, such as carboxylate, sulfonate and/or phosphonate groups.

The functional groups for nonionic hydrophilic modification are preferably poly(oxyalkylene) groups, more particularly poly(oxyethylene) groups.

The ionically hydrophilic modifications may be introduced into the polyurethane resin by monomers which contain the (potentially) ionic groups. The nonionic modifications are introduced, for example, through the incorporation of poly (ethylene) oxide polymers as lateral or terminal groups of the polyurethane molecules. The hydrophilic modifications are introduced, for example, via compounds which contain at least one group reactive toward isocyanate groups, preferably at least one hydroxyl group. For introducing the ionic modification it is possible to use monomers which as well as the modifying groups contain at least one hydroxyl group. For introducing the nonionic modifications it is preferred to use the alkoxypoly(oxyalkylene) alcohols and/or polyether diols that are known to the skilled person.

The polyurethane resin may preferably be a graft polymer. More particularly it is a polyurethane resin grafted with olefinically unsaturated compounds, preferably olefinically unsaturated monomers. In this case, therefore, the polyurethane is grafted, for example, with side groups and/or side chains which are based on olefinically unsaturated monomers. More particularly the moieties in question are side chains based on poly(meth)acrylates. Poly(meth)acrylates for the purposes of the present invention are polymers or polymeric radicals which comprise acrylate and/or methacrylate group-containing monomers, preferably being composed of acrylate and/or methacrylate group-containing monomers. By side chains based on poly(meth)acrylates are meant side chains which are constructed in the course of the graft polymerization using (meth)acrylate group-containing monomers. In the graft polymerization here, preferably more than 50 mol %, more particularly more than 75 mol %, more particularly 100 mol %, based on the total amount of the monomers used in the graft polymerization, of (meth)acrylate group-containing monomers are used.

The side chains described are preferably introduced into the polymer after the preparation of a primary polyurethane resin dispersion. In this case, the polyurethane resin present in the primary dispersion may contain lateral and/or terminal olefinically unsaturated groups via which the graft polymerization with the olefinically unsaturated compounds then proceeds. The polyurethane resin for grafting, therefore, may be an unsaturated polyurethane resin (A). The graft polymerization then constitutes a free-radical polymerization of olefinically unsaturated reactants. It is also possible, for example, for the olefinically unsaturated compounds used for the graft polymerization to contain at least one hydroxyl group. In that case there may also initially be attachment of the olefinically unsaturated compounds via these hydroxyl groups by reaction with free isocyanate groups of the polyurethane resin. This attachment takes place instead of or in addition to the free-radical reaction of the olefinically unsaturated compounds with any present lateral and/or terminal olefinically unsaturated groups of the polyurethane resin. There then follows, again, the graft polymerization via free-radical polymerization as described earlier on above. At any rate, polyurethane resins grafted with olefinically unsaturated compounds, preferably olefinically unsaturated monomers, are obtained.

As olefinically unsaturated compounds with which the polyurethane resin (A) is preferably grafted it is possible to use virtually all free-radically polymerizable, olefinically unsaturated, and organic monomers which are available for these purposes to the skilled person. A number of preferred monomer classes may be cited by way of example:

hydroxyalkyl esters of (meth)acrylic acid or of other alpha, beta-ethylenically unsaturated carboxylic acids, alkyl and/or cycloalkyl esters of (meth)acrylic acid having up to 20 carbon atoms in the alkyl radical, ethylenically unsaturated monomers containing at least one acid group, more particularly just one carboxyl group, such as (meth)acrylic acid, for example, vinyl esters of alpha-branched monocarboxylic acids having 5 to 18 carbon atoms, reaction products of (meth)acrylic acid with the glycidyl ester of an alpha-branched monocarboxylic acid having 5 to 18 carbon atoms, other ethylenically unsaturated monomers such as olefins (for example ethylene), (meth)acrylamides, vinylaromatic hydrocarbons (for example, styrene), vinyl compounds such as vinyl chloride and/or vinyl ethers, such as ethyl vinyl ether.

Preference is given to using monomers containing (meth) acrylate groups, and so the grafted-on side chains are poly (meth)acrylate-based side chains.

The lateral and/or terminal olefinically unsaturated groups in the polyurethane resin, via which the graft polymerization with the olefinically unsaturated compounds is able to proceed, are preferably introduced into the polyurethane resin via particular monomers. These particular monomers comprise not only an olefinically unsaturated group but also, for example, at least one group reactive toward isocyanate groups. Preference is given to hydroxyl groups and also primary and secondary amino groups. Hydroxyl groups are especially preferred.

Naturally, the monomers described through which the lateral and/or terminal olefinically unsaturated groups may be introduced into the polyurethane resin may also be employed without the polyurethane resin thereafter being additionally grafted with olefinically unsaturated compounds. It is preferred, however, for the polyurethane resin to be grafted with olefinically unsaturated compounds.

The polyurethane resin preferably present may be a self-crosslinking and/or externally crosslinking binder. The polyurethane resin preferably comprises reactive functional groups through which external crosslinking is possible. In this case, the pigmented aqueous basecoat material preferably comprises at least one crosslinking agent. More particularly, the reactive functional groups through which external crosslinking is possible are hydroxyl groups. For the purposes of the method of the invention it is possible with particular advantage to use polyhydroxy-functional polyurethane resins. This means that the polyurethane resin contains on average more than one hydroxyl group per molecule.

The polyurethane resin is prepared by the typical methods of polymer chemistry. This means, for example, the polymerization of polyisocyanates and polyols to polyurethanes, and the graft polymerization that preferably then follows with olefinically unsaturated compounds. These techniques are known to the skilled person and may be adapted individually. Exemplary preparation processes and reaction conditions are found in European patent EP 0 521 928 B1, page 2, line 57 to page 8, line 16.

If the basecoats preferably employed are present in the form of self-crosslinking systems, then the polyurethane resin content is 50% to 100%, preferably 50% to 90%, and more preferably 50% to 80%, by weight, based on the film-forming solids of the basecoat.

By film-forming solids is meant the nonvolatile weight fraction of the base coat, excluding pigments and any fillers. The film-forming solids can be determined as follows: A sample of the pigmented aqueous basecoat material (approximately 1 g) is admixed with 50 to 100 times the amount of tetrahydrofuran and then stirred for about 10 minutes. The insoluble pigments and any fillers are then removed by filtration, and the residue is rinsed with a little THF, after which the THF is removed from the resultant filtrate on a rotary evaporator. The filtrate residue is dried at 120° C. for two hours and the film-forming solid that results in this drying operation is weighed.

In the case of externally crosslinking systems, the polyurethane resin content is between 10% and 80%, preferably between 15% and 75%, and more preferably between 20% and 70%, by weight, based in each case on the film-forming solids of the basecoat.

The polyurethane resin preferably present possesses preferably a number-average molecular weight of 200 to 30 000 g/mol, more preferably of 2000 to 20 000 g/mol. It additionally possesses, for example, a hydroxyl number of 0 to 250 mg KOH/g, but more particularly of 20 to 150 mg KOH/g. The acid number of the polyurethane resin is preferably 5 to 200 mg KOH/g, more particularly 10 to 40 mg KOH/g. The hydroxyl number is determined in accordance with DIN/ISO 4629, the acid number in accordance with DIN 53402.

It is essential to the invention that the aqueous basecoats used in stage (1) of the method of the invention comprise at least one ester which is characterized by the following structure:

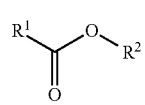

where $R^1$ is selected from the group of ethyl and isopropyl and $R^2$ is a $C_2$ to $C_8$ radical. The at least one ester is used here in an amount of 0.1% to 5%, preferably 0.1% to 4.5% and very preferably 0.2% to 4%, by weight, based on the total weight of the aqueous basecoat applied in stage (1). One of the abovementioned esters or a mixture of the abovementioned esters can be used here.

If the amount of the substituted esters used according to the invention or of a mixture of the esters used according to the invention is below 0.1% by weight, the object on which the invention is based is not achieved. If the amount is more than 5% by weight, disadvantages will occur, such as a deterioration in adhesion in the case of underbaked systems, for example.

$R^2$ is preferably a $C_2$ to $C_6$ radical, more preferably a $C_2$ to $C_4$ radical. $R^1$ is preferably isopropyl. The at least one ester is preferably selected from the group consisting of isobutyl isobutyrate, ethyl isobutyrate, propyl propionate, and butyl propionate, more preferably from isobutyl isobutyrate and ethyl isobutyrate.

Preferably a thickener is also included. Suitable thickeners include inorganic thickeners from the phyllosilicate groups. Besides the inorganic thickeners, however, it is also possible for one or more organic thickeners to be used. They are preferably selected from the group consisting of (meth) acrylic acid-(meth)acrylate copolymer thickeners, such as, for example, the commercial product Viscalex HV30 (Ciba, BASF), and polyurethane thickeners, such as, for example, the commercial product DSX® 1550 from Cognis. (Meth) acrylic acid-(meth)acrylate copolymer thickeners are those which as well as acrylic acid and/or methacrylic acid also comprise in copolymerized form one or more acrylic esters (i.e., acrylates) and/or one or more methacrylic esters (i.e., methacrylates). Common to the (meth)acrylic acid-(meth) acrylate copolymer thickeners is that in an alkaline medium, in other words at pH levels>7, more particularly >7.5, the formation of salts of the acrylic acid and/or methacrylic acid, in other words the formation of carboxylate groups, causes them to exhibit a sharp increase in viscosity. Where (meth) acrylic esters are used that are formed from (meth)acrylic acid and a $C_1$-$C_6$-alkanol, the products are substantially nonassociative (meth)acrylic acid-(meth)acrylate copolymer thickeners, such as, for example, the aforementioned Viscalex HV30. Substantially nonassociative (meth)acrylic acid-(meth)acrylate copolymer thickeners are also identified in the literature as ASE thickeners (for "Alkali Soluble/Swellable Emulsion or dispersion". Also suitable for use as (meth)acrylic acid-(meth)acrylate copolymer thickeners, however, are those known as HASE thickeners ("Hydrophobically Modified Anionic Soluble Emulsions", or dispersions). They are obtained by using, in addition to or instead of the $C_1$-$C_6$-alkanols, alkanols having a larger number of carbon atoms, 7 to 30 for example, or 8 to 20 carbon atoms. HASE thickeners are substantially associative in terms of their thickening action. On account of their thickening properties, the (meth) acrylic acid-(meth)acrylate copolymer thickeners that can be used are unsuitable as binder resins, and hence are not included among the physically, thermally, or both thermally and actinically curable binders that are referred to as binders, and are therefore explicitly different from the poly(meth) acrylate-based binders which can be used in the basecoat compositions of the invention. By polyurethane thickeners are meant the associative thickeners referred to in the literature as HEUR (Hydrophobically Modified Ethylene Oxide Urethane Rheology Modifiers). In chemical terms these are nonionic, branched or unbranched block copolymers composed of polyethylene oxide chains (and in some cases polypropylene oxide chains) which are linked to one another via urethane bonds and which carry terminal long-chain alkyl or alkylene groups having 8 to 30 carbon atoms. An example of typical alkyl groups are dodecyl or stearyl groups; an example of a typical alkenyl group is an oleyl group; a typical aryl group is the phenyl group; and an example of the typical alkylated aryl group is a nonylphenyl group. On account of their thickening properties and structure, the polyurethane thickeners are not suitable as physically, thermally, or both thermally and physically curable binder resins. They are therefore explicitly different from the polyurethanes which can be used as binders in the basecoat compositions of the invention.

The pigmented aqueous basecoat to be used preferably also comprises at least one polyester, in particular a polyester having a number-average molecular weight of 400 to 5000 g/mol. Corresponding polyesters are described in DE 4009858.

The pigmented aqueous basecoat may further comprise at least one additive. Examples of such additives are salts which can be decomposed thermally without residue, or substantially without residue, binder resins which are different from polyurethanes and are curable physically, thermally and/or with actinic radiation, further crosslinking agents, organic solvents, reactive diluents, transparent pigments, fillers, molecularly dispersively soluble dyes, nanoparticles, light stabilizers, antioxidants, deaerating agents, emulsifiers, slip additives, polymerization inhibitors, free-radical polymerization initiators, adhesion promoters, flow control agents, film-forming auxiliaries, sag control agents (SCAs), flame retardants, corrosion inhibitors, waxes, siccatives, biocides, and matting agents.

Suitable additives of the aforementioned kind are known, for example, from

German patent application DE 199 48 004 A1, page 14 line 4 to page 17 line 5,

German patent DE 100 43 405 C1, column 5 paragraphs [0031] to [0033].

They are used in the customary and known amounts.

The solids content of the basecoats used in accordance with the invention may vary according to the requirements of the case in hand. The solids content is guided primarily by the viscosity that is required for application, more particularly spray application, and hence may be adjusted by the skilled worker on the basis of his or her general art knowledge, where appropriate with the assistance of a few range finding tests.

The solids content of the basecoats is preferably 5% to 70%, more preferably 10% to 65%, and with particular preference 15% to 60%, by weight.

The solids content means that weight fraction which remains as a residue on evaporation under defined conditions. In the present specification, the solids has been determined in accordance with DIN EN ISO 3251. The measurement duration was 60 minutes at 125° C.

The basecoats used in accordance with the invention can be produced using the mixing assemblies and mixing methods that are customary and known for preparing basecoats.

The basecoats of the invention can be employed as one-component (1K), two-component (2K) or multicomponent (3K, 4K) systems. (1K) systems are preferred.

In one-component (1K) systems, binder and crosslinking agent are present alongside one another, i.e., in one component. A prerequisite for this is that the two constituents crosslink with one another only at relatively high temperatures and/or on exposure to actinic radiation.

In two-component (2K) systems, binder and crosslinking agent are, for example, present separately from one another in at least two components, which are combined not until shortly before application. This form is selected when binder and crosslinking agent react with one another even at room temperature. Coatings of this kind are employed in particular to coat heat-sensitive substrates, particularly in automotive refinish.

The application of the pigmented aqueous basecoat material used in accordance with the invention to a substrate may take place in the film thicknesses that are customary in the context of the automobile industry, in the range from, for example, 5 to 100 micrometers, preferably 5 to 60 micrometers. This is done employing, for example, the known techniques such as spraying, knife coating, brushing, pouring, dipping, impregnating, trickling or rolling. Preference is given to employing spray application methods, such as, for example, compressed air spraying, airless spraying, high speed rotation, or electrostatic spray application (ESTA), alone or in conjunction with hot spray application such as hot air spraying, for example.

After the pigmented aqueous basecoat material has been applied, it may be dried by known techniques. For example, 1K basecoat materials may be flashed at room temperature for 1 to 60 minutes and subsequently dried preferably at optionally slightly elevated temperatures of 30 to 80° C. Flashing and drying for the purposes of the present invention mean the evaporation of organic solvents and/or water, whereby the coating material becomes drier, but is not yet cured, or there is as yet no formation of a fully crosslinked coating film.

A commercially customary clearcoat material is then applied likewise by common techniques, the film thicknesses again being situated within the customary ranges, such as 5 to 100 micrometers, for example. Clearcoat materials of this kind are known to the skilled person.

Following the application of the clearcoat material, it may be flashed at room temperature for 1 to 60 minutes, for example, and optionally dried. The clearcoat material is then cured together with the pigmented basecoat material applied. Here, for example, crosslinking reactions take place, to produce a multicoat color and/or effect paint system of the invention on a substrate. Curing takes place preferably thermally or both thermally and with actinic radiation, at temperatures from 80 to 200° C.

The method of the invention can be used to coat metallic and nonmetallic substrates, more particularly plastics substrate, preferably automobile bodies or parts thereof.

The invention also provides for the corresponding coatings and for the use of the esters or mixtures of esters used in the basecoats of the invention to increase the pinholing limit and/or to reduce the number of pinholes in aqueous pigmented coatings.

The invention is illustrated below by examples.

EXAMPLES

1. Preparation of a Silver Waterborne Basecoat 1

The components listed under "aqueous phase" in table A are stirred together in the order stated to form an aqueous mixture. In the next step, an organic mixture is prepared from the components listed under "organic phase". The organic mixture is added to the aqueous mixture. The system is then stirred for 10 minutes and adjusted using deionized water and dimethanolamine to a pH of 8 and a spray viscosity of 58 mPas under a shearing load of 1000/sec, as measured using a rotational viscosimeter (Rheomat RM 180 instrument from Mettler-Toledo) at 23° C.

TABLE A

| Component | parts by weight |
|---|---|
| Aqueous phase | |
| 3% strength Na Mg phyllosilicate solution | 26 |
| Deionized water | 3 |
| Butyl glycol | 1.75 |
| Polyurethane acrylate; prepared according to page 7 line 55-page 8 line 23 of DE-A-4437535 | 4.5 |
| 20.5% strength by weight solution of DSX 1550 (Cognis), rheological agent | 0.6 |
| Polyester; prepared according to example D, column 16 lines 37-59 of DE-A-4009858 | 3.2 |
| Tensid S (BASF), surfactant | 0.3 |
| Butyl glycol | 0.55 |
| Cymel 203; melamine-formaldehyde resin, available from Cytec | 4.1 |
| 10% strength dimethylethanolamine in water | 0.3 |
| Deionized water | 6 |
| Polyurethane acrylate; prepared according to page 19 line 44-page 20 line 7 of DE-A-19948004 | 20.4 |
| Surfynol ® 104 from Air Products (52% form) surfactant | 1.6 |
| Butyl glycol | 0.5 |
| 3% strength by weight aqueous Viscalex HV 30 solution; rheological agent, available from BASF, in water | 3.9 |
| Organic phase | |
| Mixture of two commercial aluminum pigments, obtainable from Altana-Eckart | 6.2 |
| Butyl glycol | 7.5 |
| Polyester; prepared according to example D, column 16 lines 37-59 of DE-A-4009858 | 5 |

Waterborne Basecoat 11:

Inventive waterborne basecoat 11 was prepared by adding 1.5 parts by weight of commercially available isobutyl isobutyrate to waterborne basecoat 1.

Waterborne Basecoat 12:

Inventive waterborne basecoat 12 was prepared by adding 1.5 parts by weight of commercially available ethyl isobutyrate to waterborne basecoat 1.

Waterborne Basecoat 13:

Inventive waterborne basecoat 13 was prepared by adding 1.5 parts by weight of commercially available propyl propionate to waterborne basecoat 1.

Waterborne Basecoat 14:

Inventive waterborne basecoat 14 was prepared by adding 1.5 parts by weight of commercially available butyl propionate to waterborne basecoat 1.

TABLE 1

Compositions of waterborne basecoats I1-I4

| WBC | [% by weight] | Alcohol |
|---|---|---|
| I1 | 1.5 | isobutyl isobutyrate |
| I2 | 1.5 | ethyl isobutyrate |
| I3 | 1.5 | propyl propionate |
| I4 | 1.5 | butyl propionate |

The weight percent figures in table 1 relate to the fraction of the ester in each waterborne basecoat.

Comparative Experiment Between Waterborne Basecoat 1 and Waterborne Basecoats I1 to I4

For determination of the pinholing limit and the pinhole count, the multicoat paint systems were produced in accordance with the following general instructions:

A steel panel coated with a filler paint system and with dimensions of 30×50 cm was provided on one long edge with an adhesive strip, to allow the differences in film thickness to be determined after coating had taken place. The waterborne basecoat was applied electrostatically in wedge form. The resulting waterborne basecoat film was flashed off at room temperature for one minute and then dried in a forced-air oven at 70° C. for 10 minutes. Over the dried waterborne basecoat film, a customary two-component clearcoat was applied. The resulting clearcoat film was flashed off at room temperature for 20 minutes. Then the waterborne basecoat film and the clearcoat film were cured in a forced-air oven at 140° C. for 20 minutes. Following visual evaluation of the pinholes in the resulting wedge-shaped multicoat paint system, the film thickness of the pinholing limit was ascertained. The results are given in table 2.

TABLE 2

Pinholing limit and pinhole count of waterborne basecoat 1 and of waterborne basecoats I1 to I4

| WBC | Pinholing limit (μm) | Pinhole count |
|---|---|---|
| 1 | 14 | 20 |
| I1 | 21 | 9 |
| I2 | 22 | 11 |
| I3 | 17 | 7 |
| I4 | 18 | 9 |

The results emphasize the fact that the use of the inventive esters raises the pinholing limit in comparison to waterborne basecoat 1, and at the same time lowers the pinhole count.

What is claimed is:

1. A method for producing a color and/or effect paint multicoat system comprising:
   (1) applying to a substrate a pigmented aqueous basecoat material,
   (2) forming a basecoat polymer film from the pigmented aqueous basecoat material,
   (3) applying a clearcoat material to the resultant basecoat polymer film, and then
   (4) curing the basecoat polymer film together with the applied clearcoat material,
   wherein the pigmented aqueous basecoat material comprises at least one ester in an amount of 0.1% to 5% by weight, based on the total weight of the aqueous basecoat material applied in stage (1), the at least one ester having the following structure:

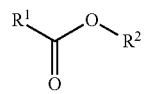

where $R^1$ is selected from the group of ethyl and isopropyl, and $R^2$ is a radical with $C_2$ to $C_8$.

2. The method of claim 1, wherein $R^2$ is a radical of C2 to $C^6$.

3. The method of claim 1, wherein $R^1$ is isopropyl.

4. The method of claim 1, wherein the at least one ester is selected from the group consisting of isobutyl isobutyrate, ethyl isobutyrate, propyl propionate, butyl propionate, and mixtures of two or more of the foregoing.

5. The method of claim 1, wherein the amount of ester or of a mixture of esters in the pigmented aqueous basecoat material comprises 0.1% to 4.5% by weight, based on the total weight of the pigmented aqueous basecoat material.

6. The method of claim 5, wherein the amount of ester or of a mixture of esters in the pigmented aqueous basecoat material is 0.2% to 4% by weight, based on the total weight of the pigmented aqueous basecoat material.

7. The method of claim 1, wherein the pigmented aqueous basecoat material comprises a binder that is at least one saturated or unsaturated polyurethane resin.

8. The method of claim 1, wherein the pigmented aqueous basecoat material comprises at least one crosslinking agent selected from the group consisting of amino resins and blocked or nonblocked polyisocyanates.

9. A method for increasing the pinholing limit and/or for reducing the number of pinholes in a color and/or effect multicoat paint system, the method comprising:
   forming a pigmented aqueous basecoat material with at least one ester in an amount of 0.1% to 5% by weight, based on the total weight of the pigmented aqueous coating material, the at least one ester having the following structure:

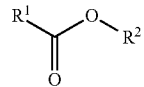

where $R^1$ is selected from the group of ethyl or isopropyl, and $R^2$ is a radical with $C_2$ to $C_8$.

* * * * *